United States Patent
Cai

(10) Patent No.: US 9,569,104 B2
(45) Date of Patent: Feb. 14, 2017

(54) ELECTRONIC DEVICE AND SCORING SYSTEM AND SCORING METHOD USING SAME

(71) Applicant: Danzhi Cai, Shenzhen (CN)

(72) Inventor: Danzhi Cai, Shenzhen (CN)

(73) Assignee: DANZHI CAI, Shenzhen (CN)

( * ) Notice: Subject to any disclaimer, the term of this patent is extended or adjusted under 35 U.S.C. 154(b) by 12 days.

(21) Appl. No.: 14/606,254

(22) Filed: Jan. 27, 2015

(65) Prior Publication Data

US 2016/0216788 A1    Jul. 28, 2016

(51) Int. Cl.
    *G06F 3/048*     (2013.01)
    *G06F 3/0488*    (2013.01)
(52) U.S. Cl.
    CPC . *G06F 3/04883* (2013.01); *G06F 2203/04808* (2013.01)
(58) Field of Classification Search
    CPC ......... G06F 3/173; G06F 3/017; G06F 3/0488
    See application file for complete search history.

(56) References Cited

U.S. PATENT DOCUMENTS

| 2011/0041102 A1* | 2/2011 | Kim ................. G06F 3/04883 715/863 |
| 2013/0305155 A1* | 11/2013 | Yoon ................ G06F 3/165 715/716 |
| 2015/0058387 A1* | 2/2015 | O'Kelley ........... G06F 15/00 708/130 |

* cited by examiner

Primary Examiner — Ariel Balaoing
(74) Attorney, Agent, or Firm — Zhigang Ma

(57) ABSTRACT

A score system is applied to an electronic device. The electronic device includes a storage unit storing a mapping relationship between touch points and score values, and a touch screen generating input signals. The control system includes a number of processing units and a number of modules which are collections of instructions executed by the number of processing units. The number of modules includes a gesture recognition module recognizing a gesture in response to the input signals and determines all coordinate values of the gesture, a comparison module comparing the coordinate values of the gesture with coordinate values of the plurality of touch points and a calculation module obtaining a score value of each touch point of which the coordinate value is equal to the one of coordinate values of the gesture and calculate a total score of the score values.

20 Claims, 5 Drawing Sheets

ELECTRONIC DEVICE AND SCORING SYSTEM AND SCORING METHOD USING SAME

FIELD

The subject matter herein relates to electronic devices, score systems and score methods.

BACKGROUND

To evaluate an object or a person, it may be necessary to score the object or the person based on various factors.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
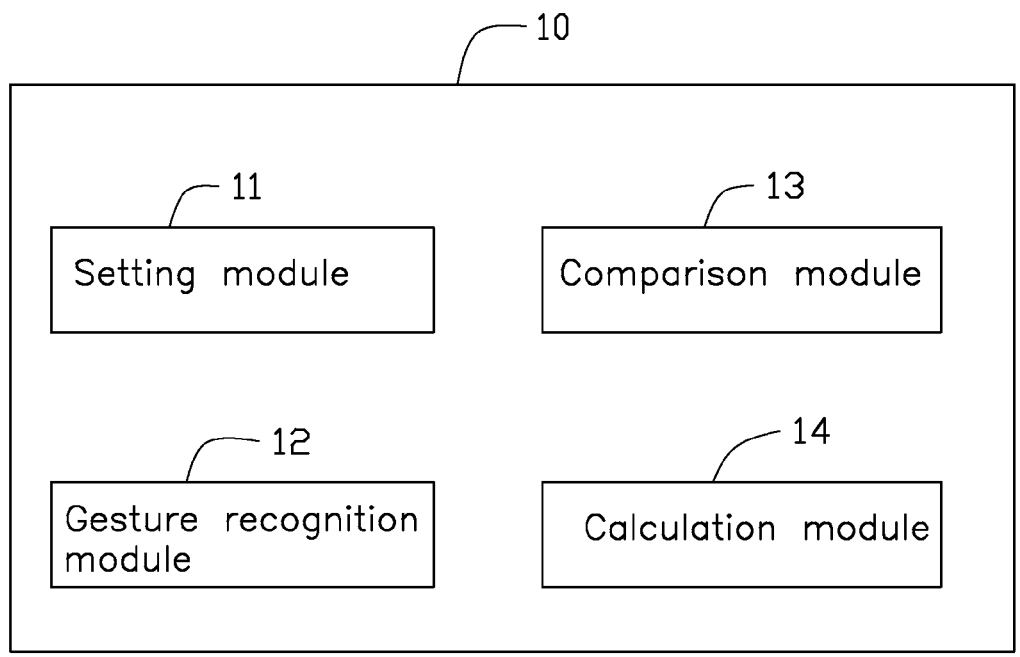
FIG. 1 is a block diagram of an embodiment of a score system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

Figure 2:
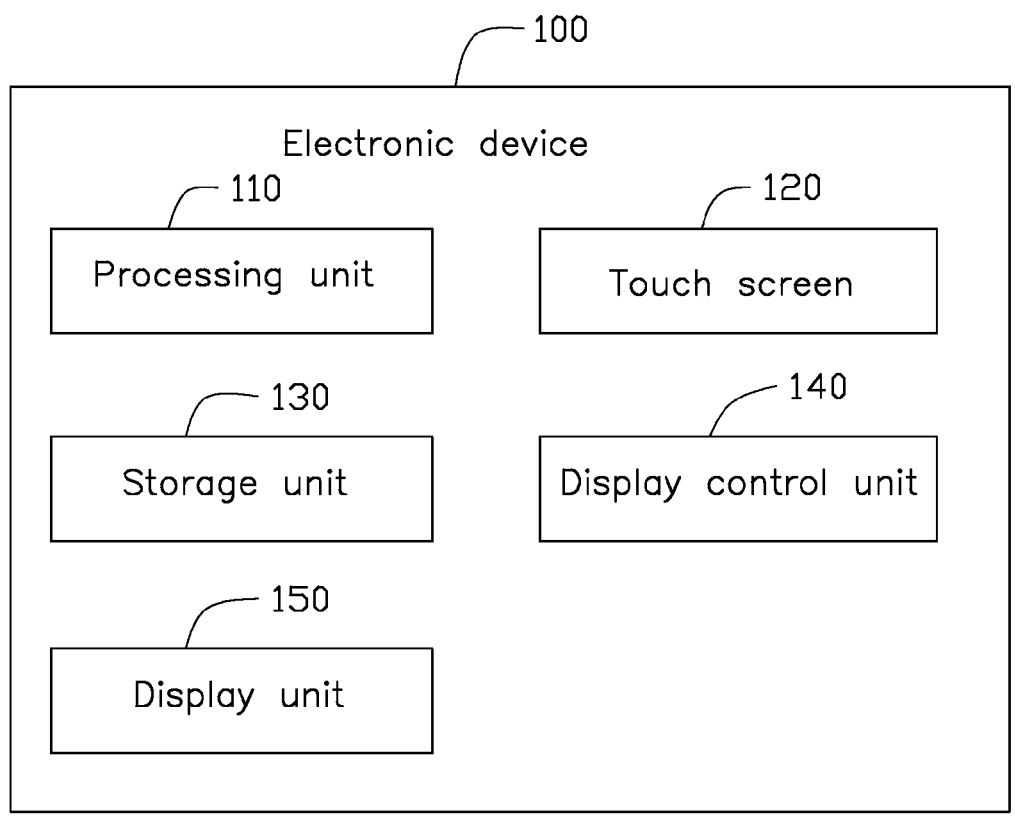
FIG. 2 is a block diagram of an embodiment of an operating environment of a score system.

Referring to FIG. 1 and FIG. 2, a score system 10 is illustrated. The score system 10 is run in an electronic device 100. The electronic device 100 can be a mobile phone or a computer which can include, but is not limited to, a portable computer, a tablet computer, or a desktop computer. The electronic device 100 can include a processing unit 110, a touch screen 120, a storage unit 130, a display control unit 140 and a display unit 150.

The touch screen 120 can be used to generate input signals in response to a user's input operation applied thereon.

The score system 10 can include a setting module 11, a gesture recognition module 12, a comparison module 13 and a calculation module 14. In the embodiment, the setting module 11, the gesture recognition module 12, the comparison module 13 and the calculation module 14 can be a collection of software instructions stored in the storage unit 130 of the electronic device 100 and executed by the processing unit 110 of the electronic device 100.

In at least one embodiment, the processing unit 110 can be a central processing unit, a digital signal processor, or a single chip, for example. In at least one embodiment, the storage unit 130 can be an internal storage system, such as a flash memory, a random access memory (RAM) for temporary storage of information, and/or a read-only memory (ROM) for permanent storage of information. The storage unit 130 can also be a storage system, such as a hard disk, a storage card, or a data storage medium. The storage unit 130 can include volatile and/or non-volatile storage devices. In at least one embodiment, the storage unit 130 can include two or more storage devices such that one storage device is a memory and the other storage device is a hard drive. Additionally, the storage unit 130 can be respectively located either entirely or partially external relative to the electronic device 100.

The setting module 11 can be used to define a number of touch points which each touch point has a coordinate value, a number of score values, and a mapping relationship between the number of touch points and the number of score values and further control the storage unit 130 to store therein.

Figure 3:
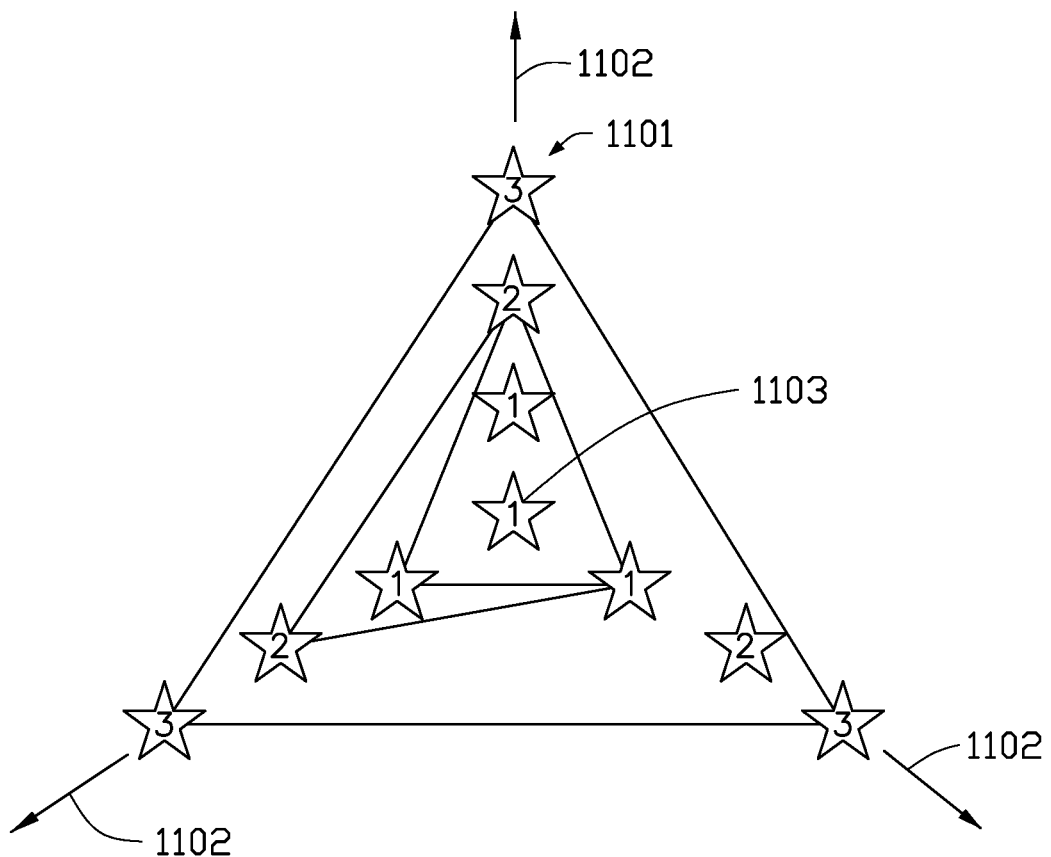
FIG. 3 is a diagram of an embodiment of a first pattern displayed on a user interface of an electronic device.
Figure 4:
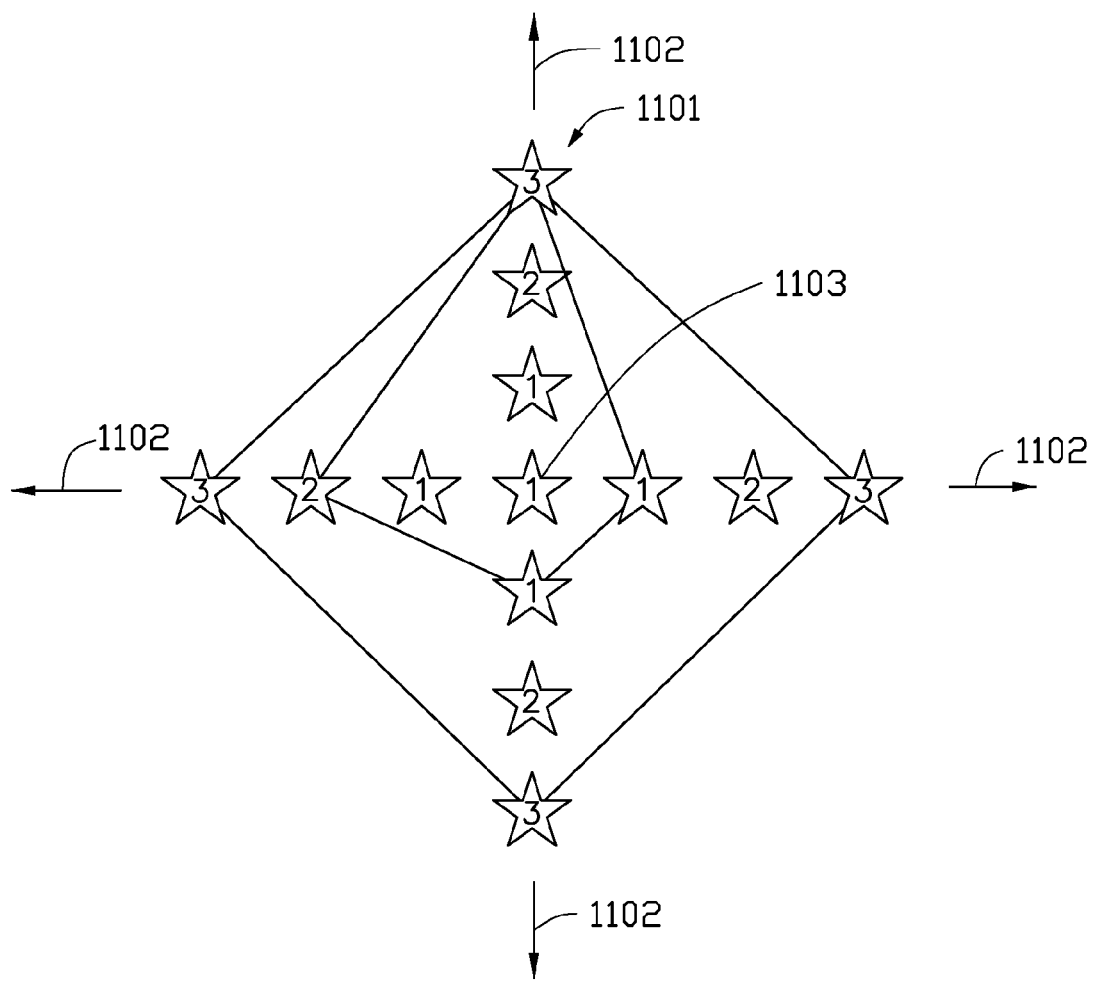
FIG. 4 is a diagram of an embodiment of a second pattern displayed on a user interface of an electronic device.

In this embodiment, the touch points can cooperatively form a pattern 1101 such as shown in FIGS. 3 and 4. The display control unit 140 can be used to control the display unit 150 to display the pattern 1101. The pattern 1101 can include a number of branches 1102. Each branch 1102 can be a dimension representing a score factor and include a number of touch points. Each touch point can be assigned to a score value and the number of touch points in the one branch 1102 can be assigned to different score values. Referring to FIG. 3, the pattern 1101 includes three branches with a cross point 1103 and each branch 1102 is started from the cross point 1103. The cross point 1103 is a touch point as well and the score value of the cross point 1103 is set to 1. Score values of touch points nearest to the cross point 1103 is also set to 1, and score values of the touch points away from the cross point 1103 is set to 2 and 3 depending on the distance between the touch point and the cross point 1103. Referring to FIG. 4, the pattern 1101 includes four branches with a cross point 1103 and each branch 1102 is started from the cross point 1103. The cross point 1103 is a touch point as well and the score value of the cross point 1103 is set to 1. Score values of touch points nearest to the cross point 1103 is also set to 1, and score values of the touch points away from the cross point 1103 is set to 2 and 3 depending on the distance between the touch point and the cross point 1103. In the case of the pattern 1101 including three branches 1102, the first one of the three branches 1102 can be a dimension representing work ability, the second one of the three branches 1102 can be a dimension representing learning ability, and the third one of the three branches 1102 can be a dimension representing social skill. In another example, the three branches 1102 can represent other three score factors. In detail, the first score factor can be romantic ability, the second score factor can be humor ability, and the third score factor can be tease ability. In at least one embodiment, the score factor can be predefined according to need.

The gesture recognition module 12 can be used to recognize a gesture in response to the input signals and determine all coordinate values of the recognized gesture. The display control unit 140 can be used to control the display unit 150 to display the recognized gesture.

The comparison module 13 can be used to compare coordinate values of the recognized gesture with coordinate values of the number of touch points, and determine whether there is at least one coordinate value of the recognized gesture equal to one of the coordinate values of the number of touch points.

The calculation module 14 can be used to obtain a score value of each touch point of which the coordinate value is equal to one of coordinate values of the recognized gesture and calculate a total score of the obtained score values. The display control unit 140 can be used to control the display unit 150 to display the total score.

In at least one embodiment, the gesture can be a slide gesture, but not limited to a swipe gesture touched in a pre-determined time duration, a two fingers slide gesture, or a multi fingers slide gesture.

Figure 5:
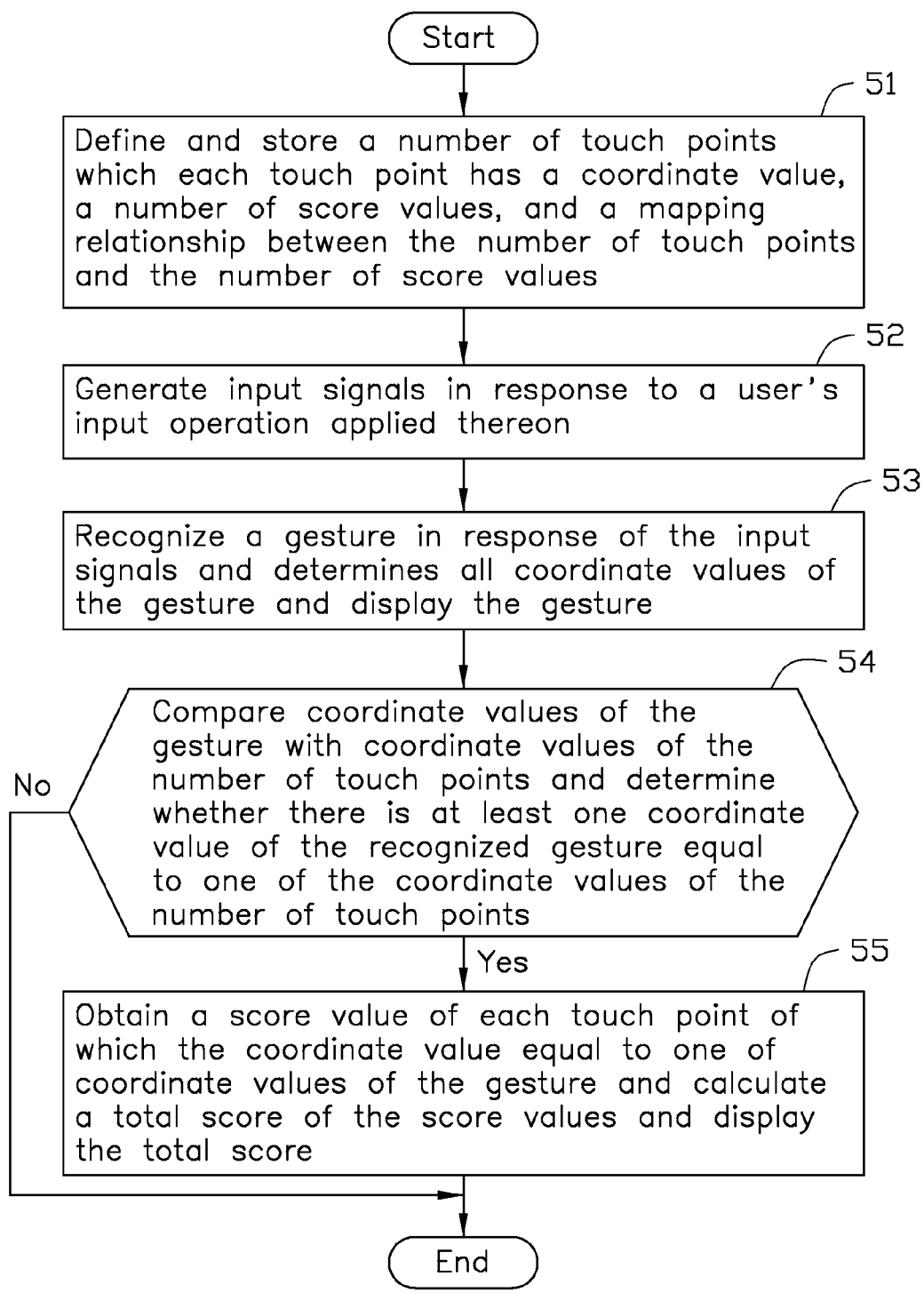
FIG. 5 is a flowchart of an embodiment of a score method.

FIG. 5 illustrates a flowchart of the score method. The method is provided by way of example, as there are a variety of ways to carry out the method. The method described below can be carried out using the configurations illustrated in FIG. 1, for example, and various elements of these figures are referenced in explaining the example method. Each block shown in FIG. 5 represents one or more processes, methods, or subroutines carried out in the example method. Additionally, the illustrated order of blocks is by example only and the order of the blocks can be changed. The example method can begin at block 51.

At block 51, a setting module defines a number of touch points which each touch point has a coordinate value, a number of score values, and a mapping relationship between the number of touch points and the number of score values and controls a storage unit to store therein.

At block 52, a touch screen generates input signals in response to a user's input operation applied thereon.

At block 53, a gesture recognition module recognizes a gesture in response to the input signals and determines all coordinate values of the recognized gesture, a display control unit controls a display unit to display the recognized gesture.

At block 54, a comparison module compares coordinate values of the recognized gesture with coordinate values of the number of touch points, and determines whether there is at least one coordinate value of the recognized gesture equal to one of the coordinate values of the number of touch points, if yes, the process goes to block 55, otherwise, the process goes to end.

At block 55, a calculation module obtains a score value of each touch point of which the coordinate value equal to one of coordinate values of the recognized gesture and calculates a total score of the obtained score values, and the display control unit controls the display unit to display the total score.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A score method, applied to an electronic device comprising:
a storage unit storing a plurality of touch points, a plurality of score values, and a mapping relationship between the plurality of touch points and the plurality of score values, wherein each of the plurality of touch points has a first coordinate value;
and a touch screen generating input signals in response to a user's input operation applied thereon;
the score method comprising:
recognizing a gesture in response to the input signals and determining a second coordinate value of each point of the gesture;
comparing each of the second coordinate values of the gesture with each of the first coordinate values of the plurality of touch points and determining whether at least one of the second coordinate values of the gesture is equal to one of the first coordinate values of the plurality of touch points; and
obtaining a score value corresponding to each touch point of which the first coordinate value is equal to one of the second coordinate values of the gesture based on the mapping relationship and calculating a total score of the obtained score values.

2. The score method of claim 1, wherein the electronic device comprises a display unit, the score method further comprises:
controlling the display unit to display the gesture.

3. The score method of claim 1, wherein the electronic device comprises a display unit, the score method further comprises:
controlling the display unit to display the total score.

4. The score method of claim 1, further comprising:
defining the plurality of touch points, the plurality of score values, and the mapping relationship between the plurality of touch points and the plurality of score values and controlling the storage unit to store therein.

5. The score method of claim 4, wherein the plurality of touch points cooperatively form a pattern, the pattern comprises multiple dimensions, and each of the multiple dimensions represents a score factor.

6. The score method of claim 5, wherein each of the multiple dimensions comprises a part of the plurality of touch points and a part of the plurality of score values corresponding to the part of the plurality of touch points based on the mapping relationship, in each of the multiple dimensions the part of the plurality of score values are assigned to different values.

7. An electronic device comprising:
a storage unit storing a plurality of touch points, a plurality of score values, and a mapping relationship between the plurality of touch points and the plurality of score values, wherein each of the plurality of touch points has a first coordinate value;
a touch screen generating input signals in response to a user's input operation applied thereon;
a processing unit; and
a plurality of modules which are collections of instructions executed by the processing unit, the plurality of modules comprising:
a gesture recognition module recognizing a gesture in response to the input signals and determining a second coordinate value of each point of the gesture;

a comparison module comparing each of the second coordinate values of the gesture with each of the first coordinate values of the plurality of touch points and determining whether at least one of the second coordinate values of the gesture is equal to one of the first coordinate values of the plurality of touch points; and a calculation module obtaining a score value corresponding to each touch point of which the first coordinate value is equal to one of the second coordinate values of the gesture based on the mapping relationship and calculating a total score of the obtained score values.

8. The electronic device of claim 7, further comprising a display control unit and a display unit, the display control unit controls the display unit to display the gesture.

9. The electronic device of claim 7, further comprising a display control unit and a display unit, the display control unit controls the display unit to display the total score.

10. The electronic device of claim 7, wherein the plurality of modules comprises a setting module, the setting module defines the plurality of touch points, the plurality of score values, and the mapping relationship between the plurality of touch points and the plurality of score values and controls the storage unit to store therein.

11. The electronic device of claim 10, wherein the plurality of touch points cooperatively forms a pattern, the pattern comprises multiple dimensions, and each of the multiple dimensions represents a score factor.

12. The electronic device of claim 11, wherein each of the multiple dimensions comprises a part of the plurality of touch points and a part of the plurality of score values corresponding to the part of the plurality of touch points based on the mapping relationship, in each of the multiple dimensions the part of the plurality of score values are assigned to different values.

13. The score method of claim 5, wherein the score factor is defined as an aspect of personal abilities.

14. The score method of claim 13, wherein the score factor is selected from work ability, learning ability, social skill, romantic ability, humor ability, and tease ability.

15. The score method of claim 6, wherein the pattern comprises three-pointed branches or four-pointed branches with a cross point, and the branches are corresponding to the multiple dimensions respectively.

16. The score method of claim 15, wherein in each of the multiple dimensions the score value of each touch point is substantially positively correlated to a distance between the touch point and the cross point.

17. The electronic device of claim 11, wherein the setting module defines the score factor as an aspect of personal abilities.

18. The electronic device of claim 17, wherein the score factor is selected from work ability, learning ability, social skill, romantic ability, humor ability, and tease ability.

19. The electronic device of claim 12, wherein the pattern comprises three-pointed branches or four-pointed branches with a cross point, and the branches are corresponding to the multiple dimensions respectively.

20. The score system of claim 19, wherein in each of the multiple dimensions the score value of each touch point is substantially positively correlated to a distance between the touch point and the cross point.

* * * * *